Patented Dec. 25, 1928.

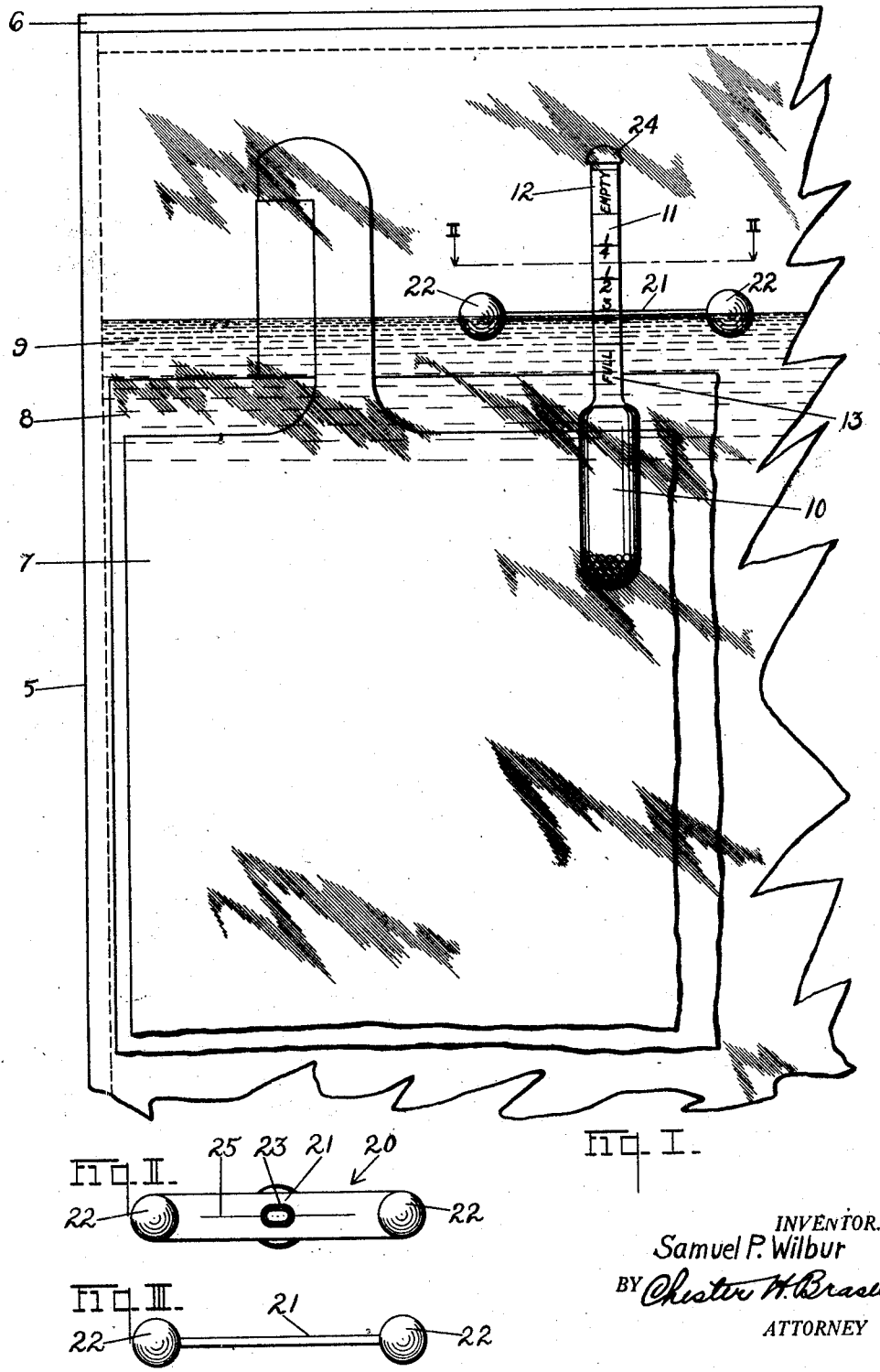

1,696,618

UNITED STATES PATENT OFFICE.

SAMUEL P. WILBUR, OF TOLEDO, OHIO, ASSIGNOR, BY MESNE ASSIGNMENTS, TO U S L BATTERY CORPORATION, A CORPORATION OF NEW YORK.

HYDROMETER DEVICE.

Application filed May 26, 1920, Serial No. 384,405. Renewed January 16, 1928.

This invention relates to specific gravity devices and particularly to those which float in the liquid being measured and have a graduated portion extending up out of the liquid.

It is well known to those having the care and maintenance of storage batteries that the most reliable indication of the state of charge of such a battery is the specific gravity of the electrolyte. Various devices are employed for measuring the specific gravity of the electrolyte, a common one being a floating hydrometer which may be permanently retained in the pilot cell, or, if preferred and where circumstances permit, may be contained in a syringe. In the case where glass jars are used to hold the active elements of the battery and an hydrometer graduated in the usual manner is immersed in the electrolyte difficulty often arises in reading the scale on the hydrometer. This is due to a variety of causes, such for example as irregularities in the glass of the jar, the presence of gas bubbles which obscure the vision, condensation on the inner surface of the jar and the meniscus about the hydrometer stem due to surface tension. For certain kinds of work it is not always necessary to make an exact reading of the specific gravity but rather it is more desirable for the operator, who may be unaccustomed to reading devices of that nature, to be able to ascertain at a glance and from a point some distance away the approximate gravity condition of the battery. I have, therefore, provided an hydrometer having a stem graduated somewhat coarsely in fractions of full charge and have provided two zones on the stem which are preferably of different and contrasting colors. To further facilitate reading I provide a float which slidingly engages the stem of the hydrometer and which is of a color to contrast with the aforementioned zones of the hydrometer.

It is an object, therefore, of my invention to provide means whereby the reading of a specific gravity device of the nature stated may be more readily observed. Another object is the provision of means whereby an observer may be able to ascertain at a glance and at a considerable distance away whether or not the gravity of the liquid being measured is within a certain range and a further object of my invention is to provide against the total submersion or temporary loss of the specific gravity device should the density of the liquid fall to a sufficiently low value.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part hereof, in which:

Figure I is a side elevation of a storage battery contained in a glass jar illustrating my invention. Fig. II is a sectional view taken on line II—II of Fig. I and Fig. III is a side elevation of the float.

In the drawings, the same reference numerals refer to similar parts throughout the several views, and the sectional views are taken looking in the direction of the arrows at the ends of the section lines.

Referring to the drawings, 5 indicates the glass jar in which the active elements of the battery are contained, the top being enclosed by cover 6. One of the active elements is shown at 7, being separated from its neighbor by the usual separator 8, and immersed in the electrolyte 9.

An hydrometer 10 having a stem 11 floats in the electrolyte and serves to show the specific gavity of the electrolyte and thus indicate the state of charge of the battery. The hydrometer in this case is not shown with its scale calibrated in the specific gravity units ordinarily employed on hydrometers of this nature but is shown rather with its scale divided into comparatively coarse graduations and designed by fractions corresponding to the degree of full charge of the battery. The upper portion of the stem is preferably marked by a distinct color, as for example, red which forms a zone 12 extending upward a short distance from a point corresponding to a zero reading of the hydrometer. This zone is shown marked by the word "empty" and is for the purpose of giving the operator warning that when this portion of the hydrometer only is visible above the liquid level that the battery is in need of a charge. Adjacent the opposite end of the stem beginning at a point corresponding to 1 on the scale and extending downward for a short distance therefrom is a second colored zone 13 which may, for convenience, be colored blue. When this zone appears above the liquid level it serves to advise the operator that a state of full charge has been reached and further charging is unnecessary.

A float device 20 comprising a thin flat strip 21 at the opposite ends of which are attached buoyant members 22 has an opening 23 formed in its intermediate portion through which the stem of the hydrometer is adapted to freely slide. This float may be constructed of any suitable material not attacked by the electrolyte and which will maintain its shape permanently in the electrolyte. Among the variety of materials which may be used for this purpose may be mentioned glass and celluloid. The flat portion 21 of the float is preferably given a color which will form a distinct contrast with each of the aforementioned zones on the hydrometer stem. It may be found advantageous to make this intermediate portion of the float white, which serves not only to provide a constrast with each of the red and blue zones of the hydrometer but will facilitate reading the scale designations which ordinarily are formed with black figures. The float as a whole is constructed of such a weight that it will float with the narrow strip portion 21 at substantially the surface of the electrolyte.

To prevent the hydrometer from sinking entirely below the surface of the electrolyte should the gravity be permitted to fall to a sufficiently low value and thus make it inconvenient to recover the hydrometer, the upper end of the stem is provided with a slight enlargement or cap 24 which being larger than the opening in the float will not permit the hydrometer from being temporarily lost in the electrolyte. Where the float is constructed of celluloid a slit 25 may be provided therein to facilitate inserting the end of the stem into the opening.

It is to be noted that although white and black are not colors, strictly speaking, they are used for all intents and purposes in this specification in the sense of colors in the absence of a suitably broad term to cover the true colors as well as black and white.

Inasmuch as the invention herein disclosed is susceptible of various other embodiments and as various changes might be made in the embodiment set forth, it is to be understood that all matter described above or shown in the accompanying drawing is to be interpreted as illustrative only, and not in a limiting sense.

Having thus described my invention, what I claim as new and desire to secure by Letters Patent, is:

1. In combination a specific gravity responsive device having a vertically projecting stem, said stem having a zone of a distinctive appearance, a float adapted to cooperate with said stem and present a contrast with said zone.

2. In combination a specific gravity responsive device having a vertically projecting stem, said stem having a color zone and a float co-operating with said stem of a color to produce a distinct contrast with said zone.

3. In combination a specific gravity responsive device, having a vertically projecting stem divided into a plurality of color zones and a device adapted to float on the surface of a liquid and co-operate with said stem, said floating device having that portion adjacent said stem of a color to show a contrast with the zones of the stem.

4. In combination, a hydrometer having an enlarged head portion, and a float having an aperture formed therein through which said hydrometer is adapted to have vertical movement, the edges of said aperture being slit, whereby the edges will yield to permit insertion of said enlarged head portion of the hydrometer.

5. In a device of the class described, the combination of a hydrometer having a base portion, an elongated indicating portion, and an enlarged head portion, a float having an aperture formed therein through which the elongated portion of the hydrometer is adapted to have movement, said float adjacent the edge of the aperture being slit, whereby the edges of the aperture will yield to permit insertion of the large head portion of the hydrometer.

6. In a device of the class described, the combination of a hydrometer having an elongated neck portion, an enlarged head at one end of said neck portion, and a float for the hydrometer, said float having a guide aperture retaining the neck portion of the hydrometer in position while permitting vertical movement thereof, the edges of said aperture being yieldable to permit insertion of the enlarged head portion of the hydrometer.

7. In a device of the class described in combination, an hydrometer having a vertical graduated stem, the upper and lower portions of which comprise zones of different colors, a flat strip of a color different from that of either of said zones and having an opening through which said stem is adapted to slide and a buoyant member at each end of said strip adapted to hold the same substantially at the surface of the liquid whose gravity is to be measured.

8. In a device of the class described, the combination of a hydrometer having a base portion and an indicating portion, a flexible guide float having an aperture through which the indicating portion of the hydrometer is adapted to have vertical movement, and an enlarged stop having horizontal dimensions greater than the aperture, at the upper end of said hydrometer, for preventing separation of the hydrometer and float, said float adjacent the aperture being yieldable to permit insertion of the enlarged hydrometer stop.

9. In combination, a hydrometer; a float member comprising a flat strip having buoyant members at its ends; and an intermediate portion constructed to engage said hydrometer.

In testimony whereof I affix my signature.

SAMUEL P. WILBUR.